(12) United States Patent
Heeren et al.

(10) Patent No.: US 7,988,166 B2
(45) Date of Patent: Aug. 2, 2011

(54) POSITIONING FEATURE AND METHOD FOR PRECISE VEHICLE HEIGHTS

(75) Inventors: John Heeren, Sint-Truiden (BE);
Herman Sanen, Sint-Truiden (BE);
Maarten Maes, Sint-Truiden (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 123 days.

(21) Appl. No.: 12/070,536

(22) Filed: Feb. 19, 2008

(65) Prior Publication Data

US 2008/0197596 A1      Aug. 21, 2008

Related U.S. Application Data

(60) Provisional application No. 60/890,637, filed on Feb. 20, 2007.

(51) Int. Cl.
*B60G 13/00*      (2006.01)
*B60G 15/00*      (2006.01)

(52) U.S. Cl. ........... 280/124.154; 280/6.157; 280/86.75; 280/124.1; 280/124.145

(58) Field of Classification Search .............. 280/6.15, 280/6.157, 86.75, 86.752–86.754, 86.756, 280/124.1, 124.145, 124.146, 124.151, 124.154; 188/322.19, 322.12, 322.11; 267/179, 64.11, 267/221, 220, 34, 177, 175
See application file for complete search history.

(56) References Cited

U.S. PATENT DOCUMENTS

| 2,124,087 A | * | 7/1938 | Smith ........................... 267/248 |
| 3,811,664 A | * | 5/1974 | Spinks ............................ 267/66 |
| 4,145,036 A | * | 3/1979 | Moonen et al. ............... 267/221 |
| 4,366,969 A | * | 1/1983 | Benya et al. ................. 280/6.15 |
| 4,441,593 A | * | 4/1984 | Axthammer ............ 188/322.19 |
| 4,458,605 A | * | 7/1984 | Herring et al. ........... 105/197.05 |
| 5,553,713 A | * | 9/1996 | Sydekum et al. ............. 267/221 |
| 6,293,533 B1 | * | 9/2001 | Sasse ............................ 267/221 |
| 6,343,804 B1 | * | 2/2002 | Handke et al. ......... 280/124.145 |
| 6,767,010 B2 | * | 7/2004 | Miller et al. .................. 267/170 |
| 6,827,184 B1 | * | 12/2004 | Lin .......................... 188/321.11 |
| 7,077,390 B2 | * | 7/2006 | Miller et al. .................. 267/221 |
| 2004/0159993 A1 | * | 8/2004 | Miller et al. .................. 267/179 |

FOREIGN PATENT DOCUMENTS

KR   10-1999-0024062    3/1999
KR   10-2004-0104999    12/2004

OTHER PUBLICATIONS

International Search Report from co-pending application No. PCT/US2008/002161 dated Jun. 19, 2008.

* cited by examiner

*Primary Examiner* — Ruth Ilan
(74) *Attorney, Agent, or Firm* — Harness, Dickey & Pierce, PLC

(57) ABSTRACT

A corner assembly includes a suspension module and a wheel assembly. In order to compensate for tolerance stack up in relation to a specified height of the corner assembly, the attachment between a damper of the suspension module and a knuckle of the wheel assembly is adjusted. The amount of adjustment is determined by measuring the assembled length of the suspension module, comparing the measured length to a standard length and determining an amount of adjustment necessary.

14 Claims, 4 Drawing Sheets

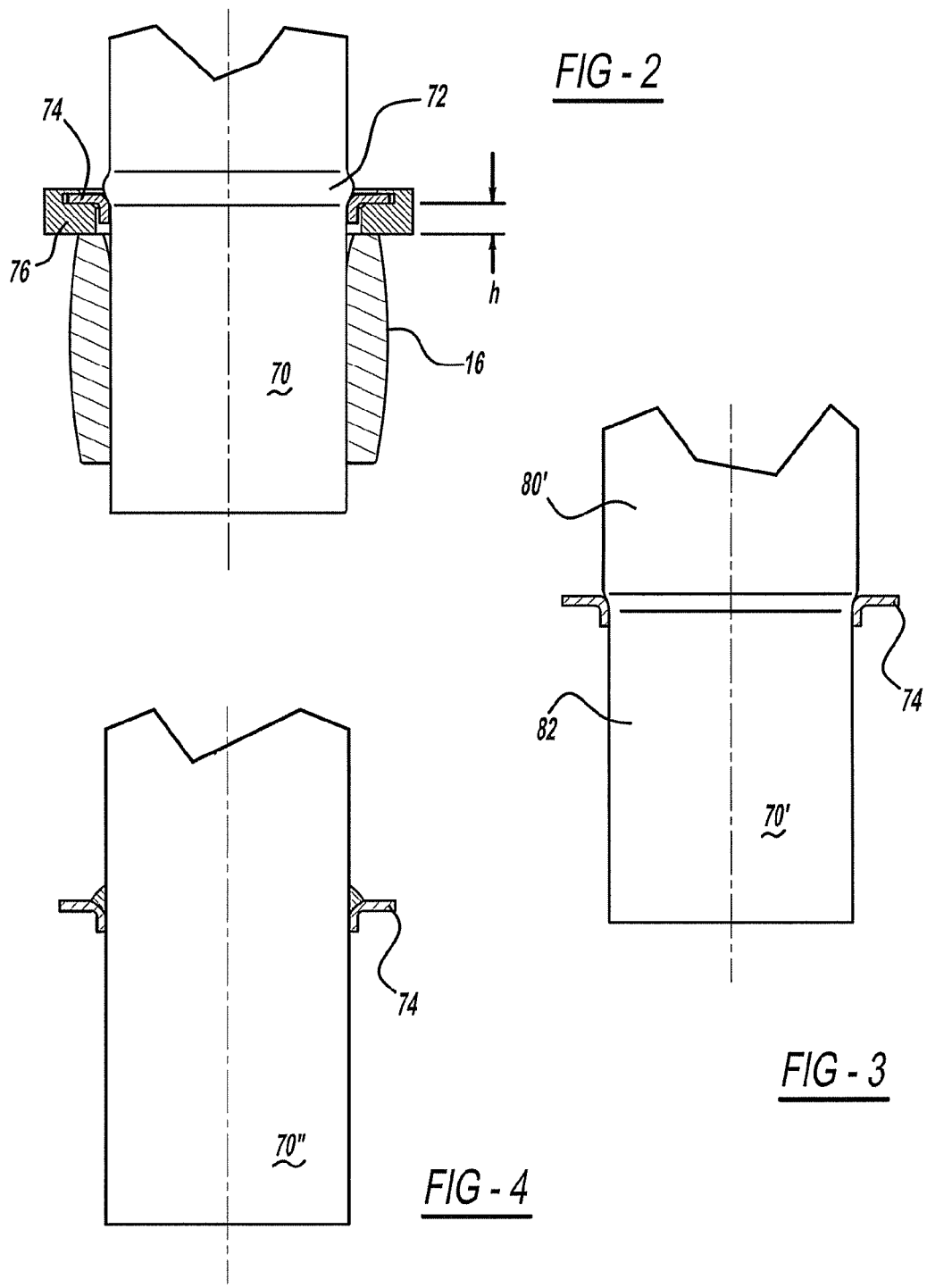

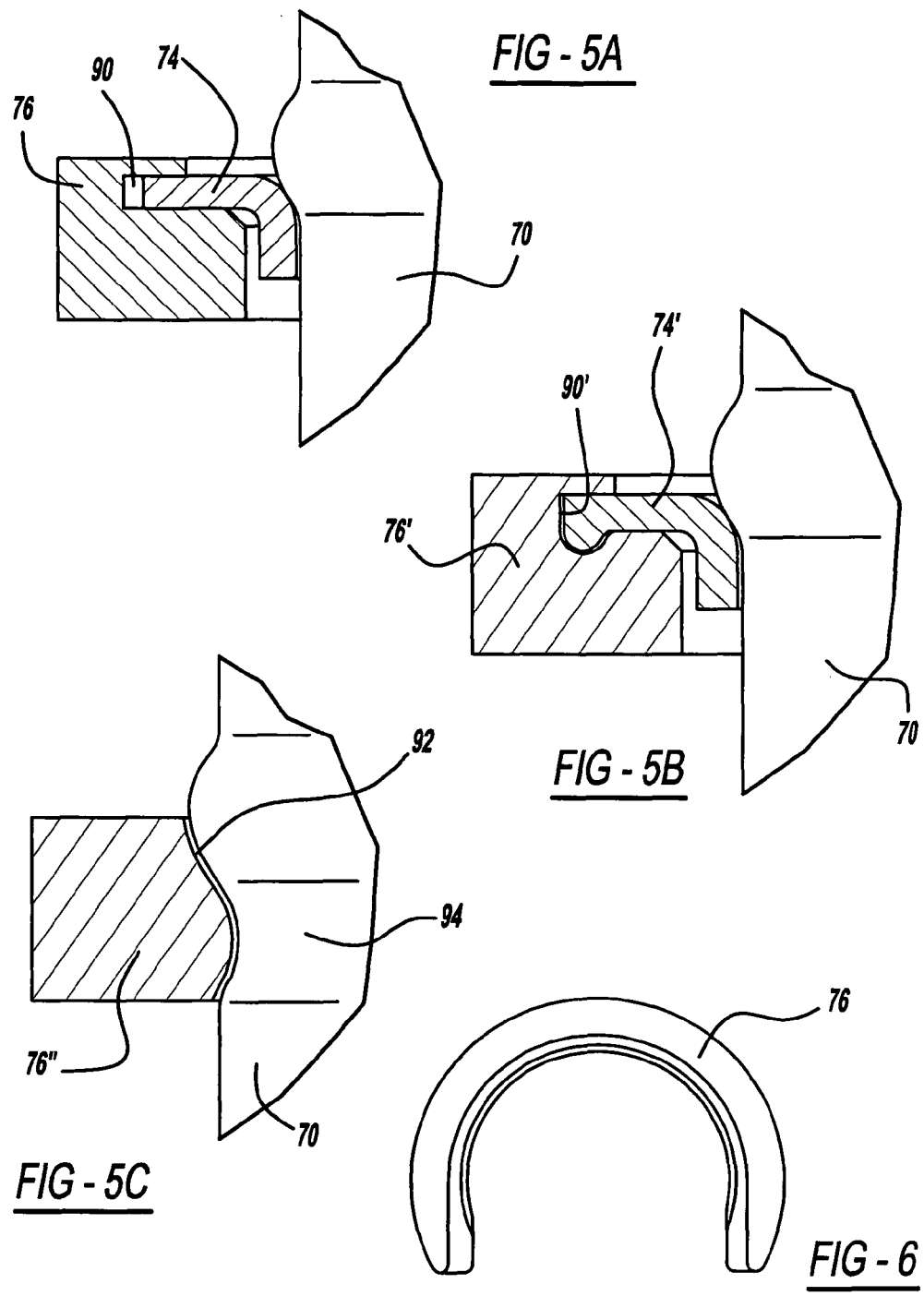

US 7,988,166 B2

POSITIONING FEATURE AND METHOD FOR PRECISE VEHICLE HEIGHTS

CROSS-REFERENCE TO RELATED APPLICATIONS

This application claims the benefit of U.S. Provisional Application No. 60/890,637, filed on Feb. 20, 2007. The disclosure of the above application is incorporated herein by reference.

FIELD

The present disclosure relates to setting a specified vehicle height for a vehicle. More particularly, the present disclosure relates to a positioning feature and a positioning method to be utilized in vehicle suspension systems for achieving precise vehicle height tolerances.

BACKGROUND

The statements in this section merely provide background information related to the present disclosure and may not constitute prior art.

The accurate setting of the suspension system of a vehicle at the design position for the vehicle height improves passenger comfort, vehicle handling performance and the visual aspects of the vehicle. The design position for the vehicle height is directly related to the design length of the McPherson suspension module or the pseudo McPherson suspension module mounted on the vehicle. Typical vehicle height tolerances can vary from about ±7 mm to about ±10 mm. If the vehicle manufacturer wants to reduce these tolerances, significant extra efforts are required and special manufacturing techniques need to be developed resulting in significant additional costs.

Vehicle manufacturers establish what the design height or vehicle height of the vehicle and thus the McPherson suspension module should be. Typically, a vehicle manufacturer will determine a specific weight of the vehicle at which the design height is defined. The specific weight can include the driver, a passenger and a specified weight for baggage of the driver and the passenger. At this specific weight of the vehicle, the nominal vehicle height and the allowed tolerances are defined.

A typical McPherson suspension module comprises a top mount connecting the module to the car body, a bearing for allowing rotation of the wheel, a spring supporting the vehicle's weight, a strut or damper providing vehicle damping, an upper and a lower spring seat supporting the spring and an anti-roll bracket to connect the anti-roll link to the strut or damper.

The achieved McPherson suspension module tolerance will be a combination of the tolerances of the top mount, the bearing, the spring, the upper seat position, the lower seat position on the strut and the positioning tolerances (in height) of the strut or damper into the knuckle. Typical design methods that ensure a correct positioning of the strut or damper into the knuckle include a reduced diameter for the strut or bearing that is inserted into the knuckle, a local area of the strut or damper tube is increased to act as a stop for the knuckle, a hook-shaped bracket can be welded to the strut or damper tube which acts as a stop for the bolt extending through the knuckle, or a T-shaped bracket can be welded to the strut or damper tube which acts as a stop in both a vertical and an angular position. The utilization of one of these methods also adds the tolerances of these components to the cumulative tolerances of the vehicle height.

In order to minimize the height tolerances of the assembled McPherson suspension module, you can individually reduce the tolerances for each of the components discussed above. This typically only results in a minimal reduction of the overall tolerance band and can lead to significantly higher manufacturing costs.

SUMMARY

The present disclosure provides a manufacturing and measuring method to measure the nominal length deviation of the assembled McPherson suspension module. After measuring the nominal length deviation of the assembled McPherson suspension module, an adjustment shim can be selected which, when used during the assembly of the McPherson suspension module to the knuckle, positions the knuckle in relation to the McPherson suspension module such that the vehicle height tolerances are minimized.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 2 is a side view of the strut or damper illustrated in FIG. 1 with a positioning fixture mounted on the outer tube;

FIG. 3 is a side view of a strut or damper similar to FIG. 2 but with a positioning fixture in accordance with another embodiment of the present disclosure mounted on the outer tube;

FIG. 4 is a side view of a strut or damper similar to FIG. 2 but with a positioning fixture in accordance with another embodiment of the present disclosure mounted on the outer tube;

FIGS. 5A-5C illustrate various designs for the fixture or shim illustrated in FIG. 6.

FIG. 6 is a plan view of the fixture of shim illustrated in FIG. 5A;

DETAILED DESCRIPTION

The following description is merely exemplary in nature and is not intended to limit the present disclosure, application, or uses.

Figure 1:
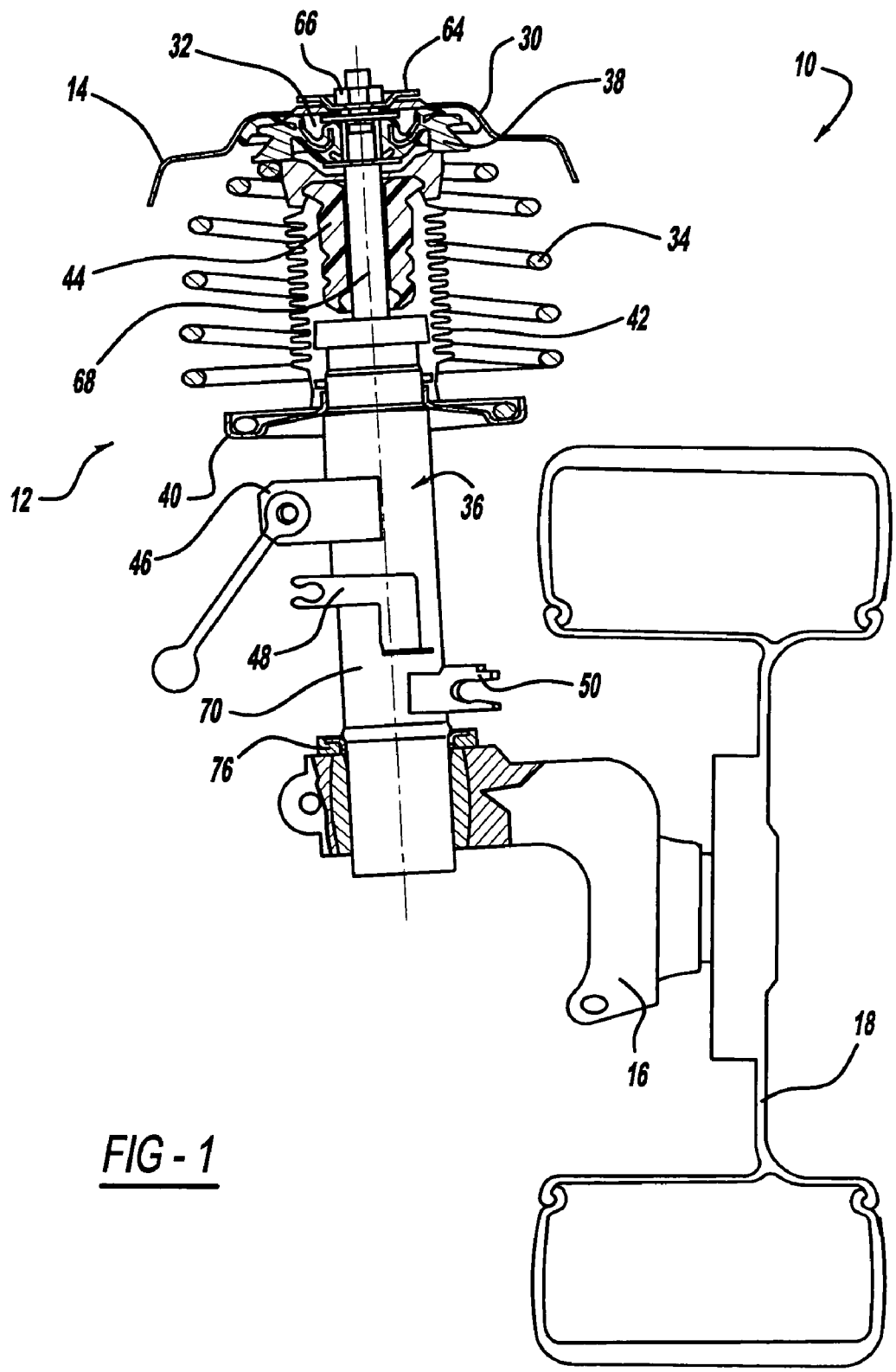
FIG. 1 is a side view of a McPherson suspension module in accordance with the present disclosure assembled into a vehicle.

Referring now to FIG. 1, a corner assembly 10 of a vehicle which incorporates the manufacturing and method in accordance with the present disclosure is illustrated. Corner assembly 10 comprises a McPherson suspension module 12, a body plate 14, and a wheel assembly including a knuckle 16 and a wheel 18.

McPherson suspension module 12 comprises an upper mount assembly including a top mount assembly 30; a bearing 32; a spring 34; a strut or damper 36; an upper spring mount 38; a lower spring mount 40; a dirt shield 42; a compression bumper 44; an anti-roll bar bracket 46; an ABS bracket 48 and a brake hose bracket 50.

Top mount assembly 30 is secured to body plate 14 using a plurality of threaded studs and their associated nuts or retainers. Top mount assembly 30 includes a metal top mount and an elastomeric bushing typically bonded to the metal top mount. Bearing 32 is disposed between top mount assembly 30 and upper spring mount 38 to allow for the rotation of wheel 18. Spring 34 extends between upper spring mount 38 and lower spring mount 40 which is attached to strut or damper 36 to support the body or sprung weight of the vehicle. Strut or damper 36 extends through the center of lower spring mount 40, spring 34, upper spring mount 38, bearing 32 and top mount assembly 30. Strut or damper 36 is secured to knuckle 16 as discussed below and to top mount assembly using a rebound plate 64 and a nut 66 to limit the extended position of wheel 18. Strut or damper 36 provides for damping of the motion of the body or sprung weight of the vehicle as it moves in relation to the suspension or unsprung weight of the vehicle. Strut or damper 36 includes piston rod 68 which receives rebound plate 64 and nut 66, a piston assembly (not shown) and an outer tube 70 within which the piston assembly slides. Damping forces are generated by controlling fluid flow from one side of the piston assembly to the opposite side of the piston assembly as is known in the art. Strut or damper 36 can be a mono-tube design, a dual-tube design or any other design of damper known in the art. Dirt shield 42 is positioned between upper spring mount 38 and lower spring mount 40 in the center of spring 34 to protect piston rod 68 from water, sand, small stones and other contaminants. Compression bumper 44 is disposed within dirt shield 42 and around piston rod 68 to limit the compressed position of wheel 18.

As discussed above, lower spring mount 40 is attached to strut or damper 36 by being welded or otherwise secured to outer tube 70 of strut or damper 36. Other components welded or otherwise secured to outer tube 70 of strut or damper 36 include anti-roll bar bracket 46 which is used to connect the anti-roll bar link to strut or damper 36. ABS bracket 48 which is used to fix the ABS cable to strut or damper 36, and brake hose bracket 50 which connects the vehicle's brake hose to strut or damper 36.

Referring now to FIG. 2, outer tube 70 of strut or damper 36 and its assembly to knuckle 16 is illustrated in greater detail. Outer tube 70 is a notched tube which includes a local diameter increased area 72. An annular seat 74, preferably of metal, is welded or otherwise attached to outer tube 70 abutting local diameter increased area 72. A fixture or shim 76, preferably of plastic is disposed between seat 74 and knuckle 16 to compensate for the accumulated tolerances of McPherson suspension module 12 and thus more accurately position the body or sprung weight at the specified design height as detailed below. As illustrated in FIGS. 1 and 2, outer tube 70 of strut or damper 36 of suspension module 12 is disposed within an aperture having a central axis defined by knuckle 16 of the wheel assembly.

FIG. 3 illustrates seat 74 positioned using an outer tube 70' which can replace outer tube 70. Outer tube 70' includes a large diameter section 80' and a reduced diameter section 82 which is sized to fit into knuckle 16. Seat 74 is attached to outer tube 70' by welding or otherwise attaching seat 74 to outer tube 70' with seat 74 abutting the transition region between section 80 and section 82.

FIG. 4 illustrates seat 74 positioned using an outer tube 70" which can replace outer tube 70 also. Outer tube 70" is a straight tube onto which seat 74 is welded or otherwise attached at the proper position.

Fixture or shim 76 can have different shapes and can be made of different materials. The preferred material is a plastic material such as Polypropelene (PP) or Polyamide (PA). The shape of fixture or shim 76 must be such that it is easily attached to seat 74 at the end of the manufacturing process but cannot detach from seat 74 at the end of the manufacturing process but cannot detach from seat 74 during transport or handling. Fixture or shim 76 when mounted to seat 74 must automatically be at the correct position (no possibility to mount at a wrong position) and as mentioned above, must remain fixed during transportation.

Referring now to FIGS. 5A-5C and FIG. 6, different designs for fixture or shim 76 are illustrated. FIG. 5A illustrates fixture or shim 76 which defines a generally rectangular slot 90 into which seat 74 is positioned. FIG. 5B illustrates a fixture or shim 76' which includes a contoured slot 90' into which an annular seat 74', having a contour matching the contour of slot 90', is positioned. FIG. 5C illustrates a fixture or shim 76" which includes a contoured inner diameter 92 which mates with an annular contoured region 94 located on outer tube 70. FIG. 6 illustrates a top view of fixture or shim 76. Fixture or shim 76 has a generally U-shape such that fixture or shim 76 can be assembled over seat 74 when seat 74 is assembled to outer tube 70. Fixtures or shims 76' and 76" are also generally U-shaped similar to fixture or shim 76.

Figure 7:
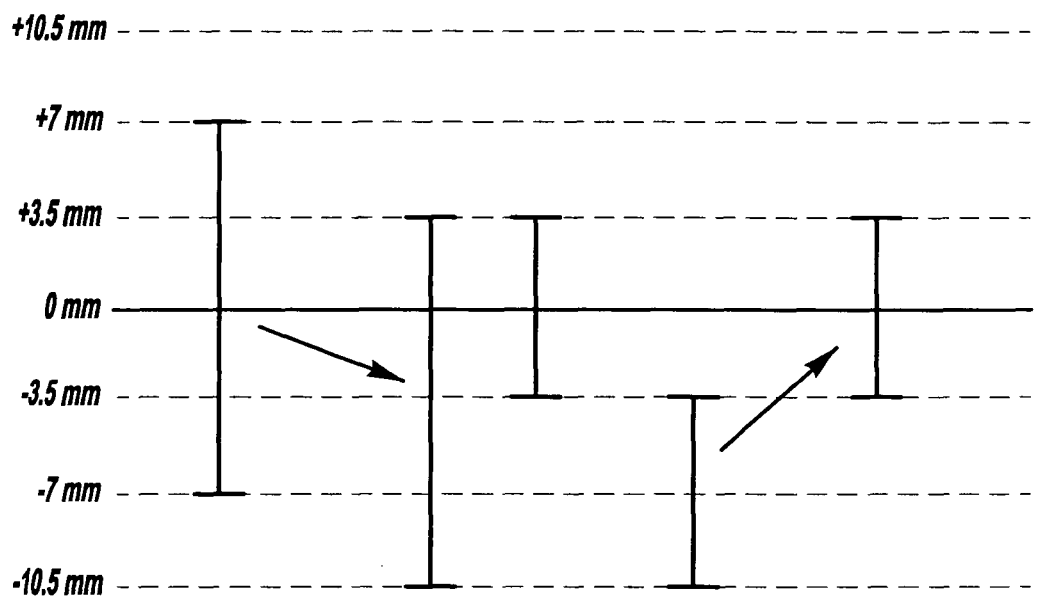
FIG. 7 is a graph illustrating the measuring method and adjustment method in accordance with the present disclosure.

Referring now to FIG. 7, the method of compensating for the tolerance build up for the vehicle height is illustrated. Initially, seat 74 or 74' or contoured region 94 will serve as a reference plane to measure the height of McPherson suspension module 12 between top mount assembly 30 and strut or damper 36. Depending on the length deviation measured, fixture or shim 76, 76' or 76" having a specific height h (shown in FIG. 2) will be clipped or assembled onto seat 74 or 74' to compensate for the measured deviation from the specified length dimension. Depending on the tolerances achieved without compensation and the desired tolerance band, a plurality of fixtures or shims 76, 76' or 76" having different heights h can be provided.

As illustrated in FIG. 7, a tolerance band of ±7 mm is achieved without any compensation measures. The desired tolerance band is assumed to be ±3.5 mm. If we assume no measurement error and no tolerance on the height h of fixture or shim 76, 76' or 76" and its assembly, then one fixture having a height h equal to 7 mm is sufficient to achieve the requested tolerance band of ±3.5 mm. First, the mean length is shifted from 0 to −3.5 mm. This yields a tolerance band of −10.5 mm to +3.5 mm. If the initial deviation is measured to be between −3.5 mm and +3.5 mm, nothing is added since the length is already within the required tolerance band. If during the manufacturing process for McPherson suspension module 12, the module length deviation of McPherson suspension module 12 is measured between −10.5 mm and −3.5 mm, the 7 mm fixture or shim 76, 76' or 76" is added. This results in a deviation between −3.5 mm and +3.5 mm which is within the required tolerance band.

This illustrates how the present disclosure works. There are some practical considerations that must be taken into account which will mostly increase the number and sizes of fixtures or shims 76, 76' or 76". For example, a measurement error, of ±1 mm will reduce the available tolerance band from ±3.5 mm to ±2.5 mm. Similar consideration should be given to the tolerance of the height h of fixtures or shims 76, 76' or 76".

While the above embodiments have been illustrated using fixture or shims 76, 76' or 76", it is also possible to achieve the desired position accuracy without the use of fixtures or shims 76, 76' or 76". This can be accomplished by identifying the required correction during the manufacturing of the McPherson suspension module and utilize an indicator such as specific color codes to indicate the correction needed and attach this indicator to the McPherson suspension module. During the mounting of the McPherson suspension module to the knuckle, the operator could then use a positioning tool having a thickness identical to the correction to establish the correct positioning of the McPherson suspension module to the knuckle. After tightening of the knuckle clamping bolt, the positioning tool can be removed and reused.

What is claimed is:

1. A corner assembly for a vehicle, the corner assembly comprising:
    a suspension module having a measured length attached to said vehicle;
    a wheel assembly attached to said suspension module; and
    a shim having a specific height disposed between said suspension module and said wheel assembly, said shim adjusting a length of said suspension module by said specific height, said specific height of said shim having been determined by said measured length of said suspension module;
    wherein said suspension module is disposed within an aperture defined by said wheel assembly, said aperture defining a central axis, said shim having a surface that directly engages said wheel assembly, said surface of said shim being generally perpendicular to said central axis.

2. The corner assembly according to claim 1, wherein said shim engages an increased diameter portion of said suspension module.

3. The corner assembly according to claim 1, wherein said shim engages a seat attached to said suspension module.

4. The corner assembly according to claim 3, wherein said seat engages an increased diameter portion of said suspension module.

5. The corner assembly according to claim 1, wherein said shim is one of a plurality of shims, each of said plurality of shims having a different height.

6. The corner assembly according to claim 1, wherein:
    said suspension module comprises a top mount assembly attached to said vehicle, an upper spring mount, a bearing disposed between said top mount assembly and said upper spring mount, a lower spring mount, a spring disposed between said upper and lower spring mounts and a damper attached to said lower spring mount, said damper being attached to said wheel assembly.

7. The corner assembly according to claim 6, wherein said wheel assembly comprises a knuckle and a wheel, the damper being attached to said knuckle.

8. The corner assembly according to claim 1, wherein:
    said corner assembly further comprises an upper spring mount, a bearing disposed between said top mount assembly and said upper spring mount, a lower spring mount, a spring disposed between said upper and lower spring mounts and said damper attached to said lower spring mount.

9. The corner assembly according to claim 8, wherein said wheel assembly comprises a knuckle and a wheel, the damper being attached to said knuckle.

10. A corner assembly for a vehicle, the corner assembly comprising:
    a top mount assembly attached to said vehicle;
    a damper attached to said top mount assembly, said top mount assembly and said damper defining a measured length;
    a wheel assembly attached to said damper; and
    a shim having a specific height disposed between said damper and said wheel assembly, said shim adjusting a length of said damper by said specific height, said specific height of said shim having been determined by said measured length;
    wherein said damper is disposed within an aperture defined by said wheel assembly, said aperture defining a central axis, said shim having a surface that directly engages said wheel assembly, said surface being generally perpendicular to said central axis.

11. The corner assembly according to claim 10, wherein said shim engages an increased diameter portion of said damper.

12. The corner assembly according to claim 10, wherein said shim engages a seat attached to said damper.

13. The corner assembly according to claim 12, wherein said seat engages an increased diameter portion of said damper.

14. The corner assembly according to claim 10, wherein said shim is one of a plurality of shims, each of said plurality of shims having a different height.

* * * * *